(12) United States Patent
Kimura et al.

(10) Patent No.: US 9,026,334 B2
(45) Date of Patent: May 5, 2015

(54) VEHICLE ATTITUDE CONTROL SYSTEM

(71) Applicant: JTEKT Corporation, Osaka-shi, Osaka (JP)

(72) Inventors: Shuuji Kimura, Kashiba (JP); Masayasu Higashi, Kashihara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/772,681

(22) Filed: Feb. 21, 2013

(65) Prior Publication Data
US 2013/0231799 A1  Sep. 5, 2013

(30) Foreign Application Priority Data
Mar. 1, 2012 (JP) ................................. 2012-045826

(51) Int. Cl.
| | |
|---|---|
| *B60W 10/20* | (2006.01) |
| *B60W 10/04* | (2006.01) |
| *B60W 30/045* | (2012.01) |
| *B62D 7/15* | (2006.01) |
| *B62D 6/00* | (2006.01) |
| *B60W 10/16* | (2012.01) |

(52) U.S. Cl.
CPC ............. *B60W 30/045* (2013.01); *B60W 10/04* (2013.01); *B60W 10/20* (2013.01); *B62D 7/159* (2013.01); *B60W 2520/14* (2013.01); *B60W 2520/20* (2013.01); *B60W 2540/18* (2013.01); *B60W 2710/207* (2013.01); *B60W 2720/14* (2013.01); *B60W 2720/20* (2013.01); *B60W 2720/406* (2013.01); *B62D 6/003* (2013.01); *B60W 10/16* (2013.01)

(58) Field of Classification Search
CPC ............. B62D 7/159; B60W 2540/18; B60W 2720/14; B60W 2720/20; B60W 2720/406; B60W 2520/14; B60W 2520/20; B60W 2710/207; B60W 10/04; B60W 10/20; B60W 30/045
USPC ........................... 701/41, 74, 82, 90; 180/197
See application file for complete search history.

(56) References Cited

U.S. PATENT DOCUMENTS

| | | | |
|---|---|---|---|
| 6,909,957 B2 * | 6/2005 | Suissa ............................. | 701/82 |
| 2004/0015284 A1 | 1/2004 | Suissa | |
| 2006/0150717 A1 | 7/2006 | Lich et al. | |

FOREIGN PATENT DOCUMENTS

| | | |
|---|---|---|
| EP | 1 958 839 A1 | 8/2008 |
| EP | 1 977 954 A2 | 10/2008 |
| JP | A-H08-282521 | 10/1996 |
| JP | A-2007-001365 | 1/2007 |
| JP | A-2007-076399 | 3/2007 |
| JP | A-2008-94214 | 4/2008 |
| JP | A-2009-018756 | 1/2009 |

OTHER PUBLICATIONS

Jul. 8, 2014 Extended European Search Report issued in European Patent Application No. 13156974.1-1752.

* cited by examiner

*Primary Examiner* — John Q Nguyen
*Assistant Examiner* — Anshul Sood
(74) *Attorney, Agent, or Firm* — Oliff PLC

(57) ABSTRACT

A vehicle attitude control system includes a control unit that calculates a front wheel control amount and a rear wheel control amount on the basis of a front-side slip angle at a front axle of front wheels and a rear-side slip angle at a rear axle of rear wheels, and that controls the front wheels on the basis of the front wheel control amount and controls the rear wheels on the basis of the rear wheel control amount at the same time.

8 Claims, 7 Drawing Sheets

VEHICLE ATTITUDE CONTROL SYSTEM

INCORPORATION BY REFERENCE/RELATED APPLICATION

This application claims priority to Japanese Patent Application No. 2012-045826 filed on Mar. 1, 2012 the disclosure of which, including the specification, drawings and abstract, is incorporated herein by reference in its entirety.

BACKGROUND OF THE INVENTION

1. Field of the Invention

The invention relates to a vehicle attitude control system that includes a control unit that controls front wheels and rear wheels.

2. Discussion of Background

A conventional vehicle attitude control system calculates a target reference yaw rate on the basis of information, such as a vehicle speed and a steering angle, and controls front wheels and rear wheels on the basis of a deviation of a yaw rate detected by a yaw rate sensor from the reference yaw rate.

Japanese Patent Application Publication No. 2008-94214 (JP 2008-94214 A) describes an example of a vehicle attitude control system. The vehicle attitude control system includes yaw moment distribution determining means for determining an operation amount of a steered angle control mechanism and an operation amount of a torque control mechanism such that a vehicle makes a movement based on the reference yaw rate. The yaw moment distribution determining means determines a yaw moment distribution between the steered angle control mechanism and the torque control mechanism on the basis of, for example, the degree of allowance of a tire friction circle of each of front and rear wheels and a frequency component of a target value of yaw moment.

Generally, the reference yaw rate is set on the basis of a vehicle model in which a tire characteristic is within a linear region, that is, a linear vehicle model, and an output from a yaw rate sensor in a state where the vehicle travels while tires are gripping a road surface. However, when there is no deviation of the output from the yaw rate sensor from the reference yaw rate, that is, when the tires are gripping a road surface, the vehicle attitude control system does not execute vehicle attitude control based on the reference yaw rate. Therefore, when the tires are gripping a road surface, it is not possible to appropriately control the travel direction of the vehicle.

In addition, in a vehicle attitude control system that has a computing equation of a reference yaw rate prescribed on the premise of predetermined vehicle specifications, when vehicle specifications (for example, vehicle weight and suspension characteristics) corresponding to the number of occupants, a superimposed load, and the like, have changed from the predetermined vehicle specifications, a reference yaw rate corresponding to the vehicle specifications is not calculated by the computing equation of the prescribed reference yaw rate. Therefore, it is not possible to appropriately control the travel direction of the vehicle.

SUMMARY OF THE INVENTION

The invention provides a vehicle attitude control system that appropriately controls the travel direction of a vehicle.

According to a feature of an example of the invention, a control unit calculates a front wheel control amount and a rear wheel control amount on the basis of a front-side slip angle that is a side slip angle at an axle of front wheels and a rear-side slip angle that is a side slip angle at an axle of rear wheels, and the control unit controls the front wheels on the basis of the front wheel control amount and controls the rear wheels on the rear wheel control amount at the same time.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
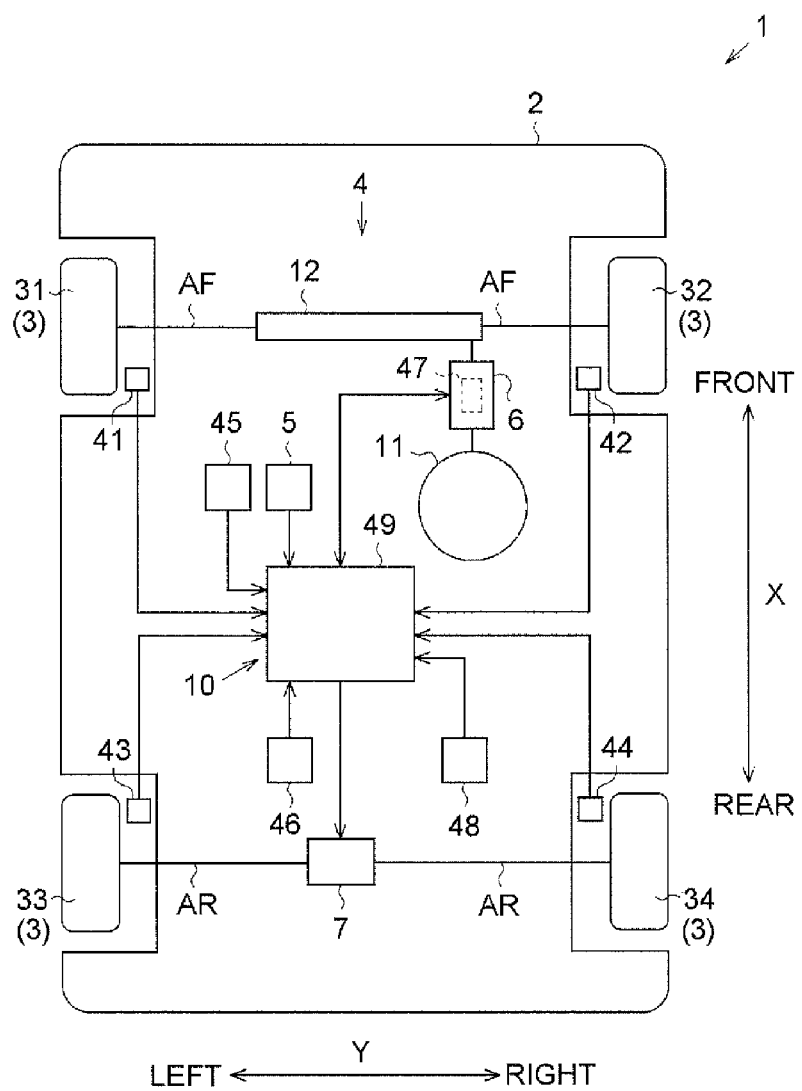
FIG. 1 is a diagram that schematically shows the overall structure of a vehicle attitude control system according to an embodiment of the invention.

FIG. 1 shows the overall configuration of a vehicle 1. An arrow X in the drawings indicates the longitudinal direction of the vehicle. An arrow Y in the drawings indicates the lateral direction of the vehicle. The longitudinal direction and the lateral direction are perpendicular to each other. The direction that is perpendicular to the longitudinal direction and the lateral direction is referred to as the up-down direction.

The vehicle 1 includes a vehicle body 2, four wheels 3 and a vehicle attitude control system 4. A left front wheel 31 and a right front wheel 32 that serve as the wheels 3 on the front side rotate about a rotation central axis that coincides with a front axle AF. A left rear wheel 33 and a right rear wheel 34 that serve as the wheels 3 on the rear side rotate about a rotation central axis that coincides with a rear axle AR. The front axle AF may function as an axle of front wheels. The rear axle AR may function as an axle of rear wheels.

A power steering system 12 connects the left front wheel 31 and the right front wheel 32 to a steering wheel 11. The steered angle of the left front wheel 31 and the right front wheel 32 is changed on the basis of the rotation angle of the steering wheel 11. The steered angle of the left rear wheel 33 and the right rear wheel 34 does not change.

The vehicle attitude control system 4 includes a vehicle body slip angle estimation unit 5, wheel speed sensors 41 to 44, an acceleration sensor 45, a yaw rate sensor 46, a steered angle sensor 47, a storage unit 48, a computation unit 49, a front wheel control unit 6 and a rear wheel control unit 7. The computation unit 49, the front wheel control unit 6 and the rear wheel control unit 7 constitute a control unit 10 that controls the front wheels 31, 32 and the rear wheels 33, 34.

The vehicle body slip angle estimation unit 5 estimates a side slip angle of the vehicle body 2. The side slip angle of the vehicle body 2 is calculated on the basis of the yaw rate and acceleration of the vehicle 1 and the coefficient of friction of a road surface. The vehicle body slip angle estimation unit 5 may function as a slip angle estimation unit that estimates a side slip angle at a predetermined location of a vehicle.

The wheel speed sensors 41 to 44 respectively detect the rotation speeds of the left front wheel 31, the right front wheel 32, the left rear wheel 33 and the right rear wheel 34. The acceleration sensor 45 detects three-axis accelerations, that is, an acceleration in the longitudinal direction, an acceleration in the lateral direction and an acceleration in the up-down direction. The yaw rate sensor 46 detects a yaw rate that is an angular velocity of rotation (turning), that is, yaw rotation, of the vehicle 1 about a rotation central axis that extends in the up-down direction. The steered angle sensor 47 detects the steered angle of the left front wheel 31 and the right front wheel 32. The steered angle that is detected by the steered angle sensor 47 indicates an actual steered angle of the left front wheel 31 and the right front wheel 32.

The storage unit 48 has a nonvolatile memory that stores information. The storage unit 48 stores a program that is executed by the computation unit 49 and information that is used in the program, such as the wheel base of the vehicle 1, the distance from the center of gravity of the vehicle 1 to the front axle AF and the distance from the center of gravity of the vehicle 1 to the rear axle AR. In addition, the storage unit 48 stores a front-side target distance Lf* and a rear-side target distance Lr* (see FIG. 2), which are set in advance. The front-side target distance Lf* and the rear-side target distance Lr* indicate the distance from the front axle AF to a target yaw rotation center position R* and the distance from the rear axle AR to the target yaw rotation center position R* (see FIG. 2), respectively. Therefore, the storage unit 48 stores the target yaw rotation center position R* in advance.

The computation unit 49 has an integrated circuit that is formed of an electronic control unit (ECU). The computation unit 49 executes a vehicle attitude control process on the basis of the program stored in the storage unit 48. In the vehicle attitude control process, the computation unit 49 calculates the side slip angle of the vehicle body 2 at the front axle AF and the side slip angle of the vehicle body 2 at the rear axle AR, and calculates a control amount for the front wheels 31, 32 and a control amount for the rear wheels 33, 34 on the basis of the side slip angles.

The front wheel control unit 6 is formed of an active steering control unit that is able to control the steered angle of the left front wheel 31 and the right front wheel 32 independently from the steering angle of the steering wheel 11. The front wheel control unit 6 incorporates therein the steered angle sensor 47.

The rear wheel control unit 7 is formed of a right and left driving force distribution control unit that controls the driving force distribution ratio between the rear wheels 33, 34. The rear wheel control unit 7 controls the ratio between the driving force of the left rear wheel 33 and the driving force of the right rear wheel 34, the rear wheels 33, 34 being drive wheels.

Figure 2:
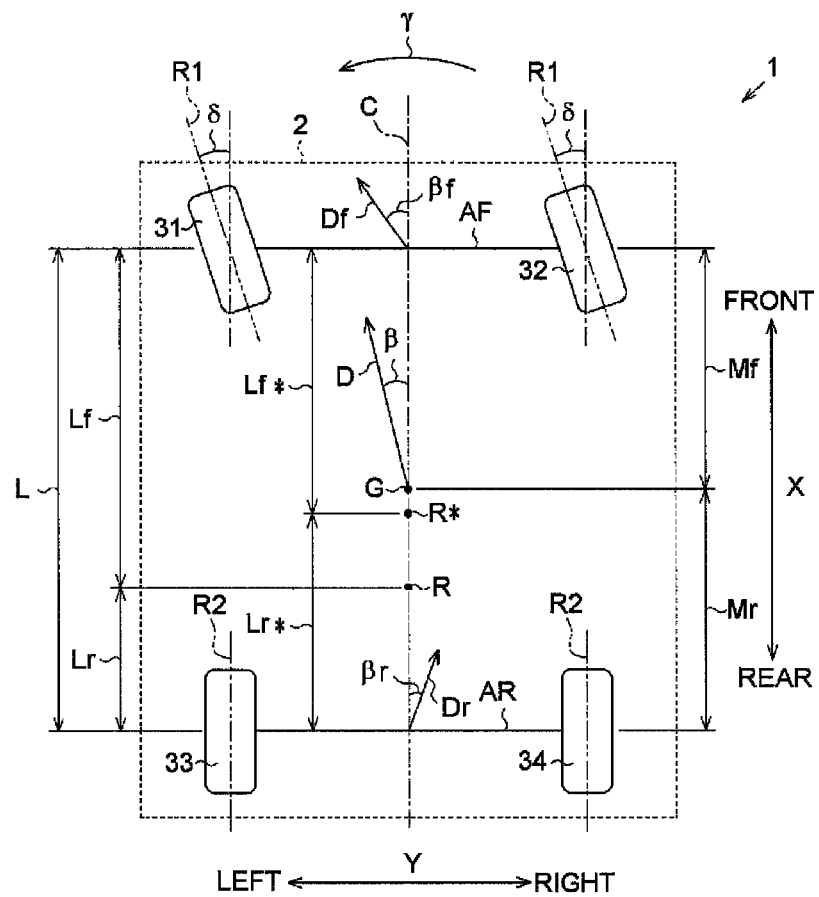
FIG. 2 is a diagram that schematically shows a vehicle that includes the vehicle attitude control system according to the embodiment.

The physical quantities that are used in attitude control on the vehicle 1 will be described with reference to FIG. 2. A long dashed short dashed line C indicates the lateral central axis of the vehicle 1 (hereinafter, referred to as "lateral central axis C"). The lateral central axis C extends parallel to the longitudinal direction of the vehicle 1.

A point G indicates the position of the center of gravity of the vehicle 1 and the vehicle body 2 (hereinafter, referred to as "center of gravity G"). The center of gravity G is located at the center between the front axle AF and the rear axle AR in the longitudinal direction. A point R indicates the yaw rotation center position of the vehicle 1 and the vehicle body 2 (hereinafter, referred to as "yaw rotation center position R"), the yaw rotation center position corresponding to the rotation central axis that extends in the up-down direction.

A point R* indicates a target yaw rotation center position of the vehicle 1 and the vehicle body 2 (hereinafter, referred to as "target yaw rotation center position R*"). The target yaw rotation center position R* is defined by a target control balance ratio "Lf*:Lr*" that is determined by the front-side target distance Lf* and the rear-side target distance Lr*. The target yaw rotation center position R* is a position at which the distance from the front axle AF to the rear axle AR is divided at the ratio of "Lf*:Lr*". The front-side target distance Lf* indicates a distance from the target yaw rotation center position R* to the front axle AF in the longitudinal direction. In addition, the rear-side target distance Lr* indicates a distance from the target yaw rotation center position R* to the rear axle AR in the longitudinal direction.

An arrow γ indicates the rotation direction (turning direction) of the vehicle 1 about an axis that coincides with the yaw rotation center position R. The yaw rate sensor 46 detects the angular velocity of the vehicle 1, of which the positive direction is indicated by the arrow γ in the drawing, about a rotation central axis that coincides with the yaw rotation center position R, as the yaw rate of the vehicle 1.

An angle β corresponds to a side slip angle of the vehicle body 2, which is estimated by the vehicle body slip angle estimation unit 5 (hereinafter, referred to as "vehicle body slip angle β"). The vehicle body slip angle β is an angle formed between a travel direction D of the vehicle 1 and the lateral central axis C, at the center of gravity G on the lateral central axis C of the vehicle 1.

An angle βf corresponds to a side slip angle of the vehicle body 2 at the front axle AF (hereinafter, referred to as "side slip angle βf"). The side slip angle βf is an angle formed between the lateral central axis C of the vehicle 1 and a direction in which a front portion of the vehicle 1 is going to slip, indicated by an arrow Df, at a point on the lateral central axis C of the vehicle 1 and on the front axle AF (hereinafter, referred to as "front axle slip direction Df"). When the front axle slip direction Df is directed toward the inner side in the turning direction (direction indicated by the arrow γ) with respect to the lateral central axis C, the side slip angle βf is indicated by a positive value. On the other hand, when the front axle slip direction Df is directed toward the outer side in the turning direction with respect to the lateral central axis C, the side slip angle βf is indicated by a negative value. The side slip angle βf corresponds to a front-side slip angle.

An angle βr corresponds to a side slip angle of the vehicle body 2 at the rear axle AR (hereinafter, referred to as "side slip angle βr"). The side slip angle βr is an angle formed between the lateral central axis C of the vehicle 1 and a direction in which a rear portion of the vehicle 1 is going to slip, indicated by an arrow Dr, at a point on the lateral central axis C of the vehicle 1 and on the rear axle AR (hereinafter, referred to as "rear axle slip direction Dr"). When the rear axle slip direction Dr is directed toward the outer side in the turning direction (direction opposite to the direction indicated by the arrow γ) with respect to the lateral central axis C, the side slip angle βr is indicated by a negative value. When the rear axle slip direction Dr is directed toward the inner side in the turning direction with respect to the lateral central axis C, the side slip angle βr is indicated by a positive value. The side slip angle βr corresponds to a rear-side slip angle.

The side slip angle βf increases as the distance of the yaw rotation center position R from the front axle AF increases. In addition, the side slip angle βr increases as the distance of the yaw rotation center position R from the rear axle AR increases. Therefore, when the yaw rotation center position R is located between the front axle AF and the rear axle AR, the side slip angle βr decreases as the side slip angle βf increases. On the other hand, the side slip angle βf decreases as the side slip angle βr increases.

In the case where the side slip angle βf is "βf" and the side slip angle βr is "βr", when "βf·βr" indicates a negative value, that is, when "βr" and "βr" have different signs, the yaw rotation center position R of the vehicle 1 is located between the front axle AF and the rear axle AR in the longitudinal direction. On the other hand, when "βf·βr" indicates a positive value, the yaw rotation center position R of the vehicle 1 is not located between the front axle AF and the rear axle AR in the longitudinal direction.

An angle δ indicates the steered angle of the front wheels 3 and 32. The steered angle of the front wheels 31, 32 is an angle formed between the longitudinal direction and a direction parallel to a rotation plane of each of the left front wheel 31 and the right front wheel 32, indicated by a long dashed double-short dashed line R1 in the drawing. A long dashed double-short dashed line R2 indicates a direction parallel to a rotation plane of each of the left rear wheel 33 and the right rear wheel 34.

An arrow Lf indicates a distance from the yaw rotation center position R to the front axle AF in the longitudinal direction (hereinafter, referred to as "distance Lf"). In addition, an arrow Lr indicates a distance from the yaw rotation center position R to the rear axle AR in the longitudinal direction (hereinafter, referred to as "distance Lr"). The sum of the distance Lf and the distance Lr is equal to the wheel base of the vehicle 1, which is indicated by an arrow L. That is, where the distance Lf is "Lf", the distance Lr is "Lr" and the wheel base of the vehicle 1 is "L", the equation "Lf+Lr=L" holds. That is, the wheel base corresponds to a distance from the front axle AF to the rear axle AR in the longitudinal direction.

With regard to the side slip angle βf, the side slip angle βr, the distance Lf and the distance Lr, the equation "Lr·βf+Lf·βr=0" holds. That is, the yaw rotation center position R is a position that is defined by the side slip angles βf, βr and the distances Lf, Lr.

An arrow Mf indicates a distance from the center of gravity G to the front axle AF in the longitudinal direction (hereinafter, referred to as "distance Mf"). In addition, an arrow Mr indicates a distance from the center of gravity G to the rear axle AR in the longitudinal direction (hereinafter, referred to as "distance Mr"). The sum of the distance Mf and the distance Mr is equal to the wheel base of the vehicle 1.

Figure 3:
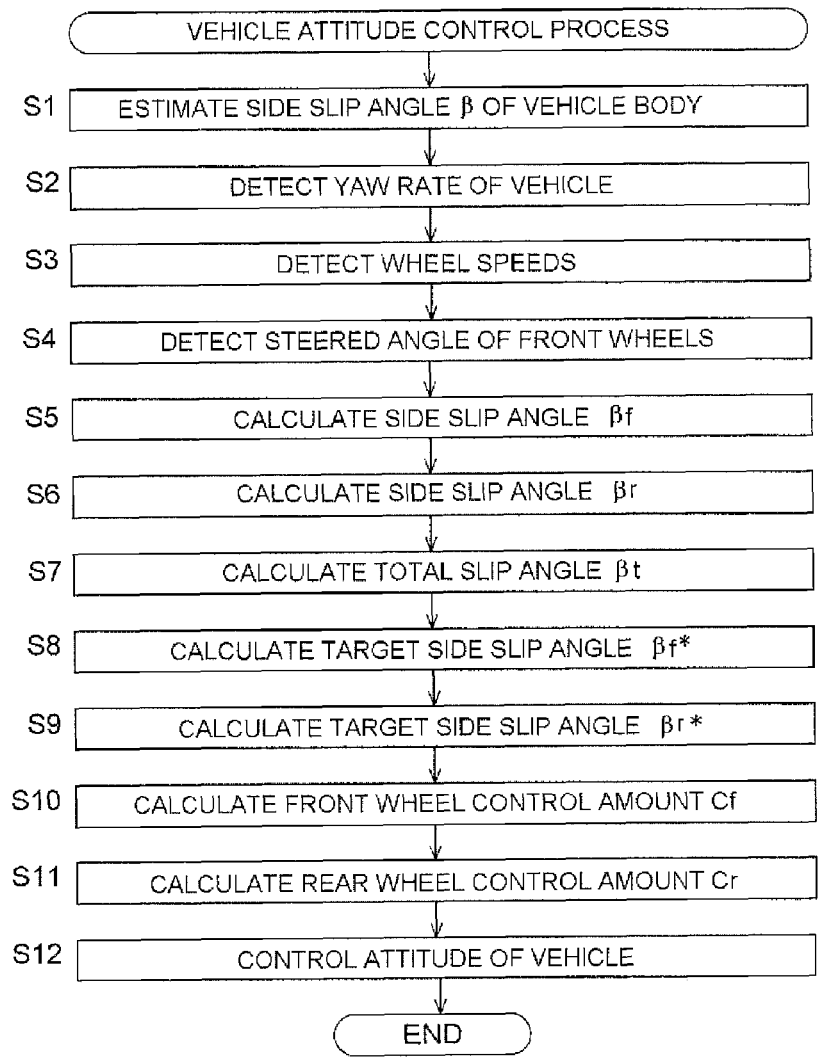
FIG. 3 is a flowchart that shows the procedure of a vehicle attitude control process that is executed by the vehicle attitude control system according to the embodiment.

The vehicle attitude control process that is executed by the vehicle attitude control system 4 will be described with reference to FIG. 3. The process of step S1 in FIG. 3 is executed by the vehicle body slip angle estimation unit 5. The processes of step S2 to step S12 in FIG. 3 are executed by the computation unit 49.

In step S1, a side slip angle β is estimated. The estimated side slip angle β is input into the computation unit 49 from the vehicle body slip angle estimation unit 5. In step S2, the yaw rate of the vehicle 1 is detected with the use of the yaw rate sensor 46.

In step S3, the wheel speeds that are the rotation speeds of the wheels 3 are respectively detected with the use of the wheel speed sensors 41 to 44, and the vehicle speed that is a speed at which the vehicle 1 travels in the travel direction is calculated on the basis of the detected wheel speeds. In step S4, the steered angle of the front wheels 31, 32 is detected with the use of the steered angle sensor 47.

In step S5, the side slip angle βf is estimated on the basis of the side slip angle β estimated in step S1, the distance Mf from the center of gravity G to the front axle AF, which is stored in the storage unit 48 in advance, the yaw rate of the vehicle 1, which is detected in step S2, and the vehicle speed calculated in step S3. Specifically, the side slip angle ⊖f is calculated according to Equation 1 indicated below. In Equation 1, the side slip angle βf is "βf", the side slip angle β is "β", the distance Mf is "Mf", the yaw rate of the vehicle 1 is "γ", and the vehicle speed is "V".

$$\beta f = \beta + Mf \cdot \gamma / V \qquad \text{Equation 1}$$

Equation 1 indicated above is the same as the equation that is obtained by setting the steered angle of the front wheels to "0" in the equation that expresses the side slip angle of the front wheels in a general vehicle model.

In step S6, the side slip angle βr is estimated on the basis of the side slip angle β estimated in step S1, the distance Mr from the center of gravity G to the rear axle AR, which is stored in the storage unit 48 in advance, the yaw rate of the vehicle 1, which is detected in step S2, and the vehicle speed calculated in step S3. Specifically, the side slip angle βr is calculated according to Equation 2 indicated below. In Equation 2, the side slip angle βr is "βr", and the distance Mr is "Mr".

$$\beta r = \beta - Mr \cdot \gamma / V \qquad \text{Equation 2}$$

Equation 2 is the same as the equation that expresses the side slip angle of the rear wheels in the general vehicle model.

In step S7, a total slip angle βt that is the difference between the side slip angle βf and the side slip angle βr is calculated on the basis of the side slip angle βf calculated in step S5 and the side slip angle βr calculated in step S6. That is, the total slip angle β is calculated according to Equation 3 indicated below. In Equation 3, the total slip angle βt is "βt".

$$\beta t = \beta f - \beta r \qquad \text{Equation 3}$$

When "βf" and "βr" have different signs, Equation 3 coincides with "βt=|βf|+|βr|".

In step S8, a target side slip angle βf* is calculated on the basis of the total slip angle βt calculated in step S7, the front-side target distance Lf* based on the target yaw rotation center position R* stored in the storage unit 48 in advance and the wheel base stored in the storage unit 48 in advance. Specifically, the target side slip angle βf* is calculated according to Equation 4. In Equation 4, the front-side target distance Lf* is "Lf*", the target side slip angle βf* is "βf*", and the wheel base is "L".

$$\beta f^* = \beta t \cdot Lf^* / L \qquad \text{Equation 4}$$

That is, in step S8, "Lf*/L" that is the ratio of the front-side target distance Lf* to the wheel base is calculated. "Lf*/L" corresponds to a front-side target ratio. Then, a value obtained by multiplying "βt" by "Lf*/L" that is the front-side target ratio is calculated as the target side slip angle βf*.

In step S9, the target side slip angle βr* is calculated on the basis of the total slip angle β3t calculated in step S7, the rear-side target distance Lr* based on the target yaw rotation center position R* stored in the storage unit 48 in advance and the wheel base stored in the storage unit 48 in advance. Specifically, the target side slip angle βr* is calculated according to Equation 5. In Equation 5, the rear-side target distance Lr* is "Lr*", and the target side slip angle βr* is "βr*".

$$\beta r^* = -\beta t \cdot Lr^* / L \qquad \text{Equation 5}$$

That is, in step S9, "Lr*/L" that is the ratio of the rear-side target distance Lr* to the wheel base is calculated. "Lr*/L" corresponds to a rear-side target ratio. Then, a value obtained by multiplying "βt" by "Lr*/L" that is the rear-side target ratio is calculated as the target side slip angle βr*.

In step S10, a front wheel control amount Cf is calculated on the basis of the target side slip angle βf* calculated in step S8 and the side slip angle βf calculated in step S5. Specifically, the front wheel control amount Cf is calculated according to Equation 6. In Equation 6, the front wheel control amount Cf is "Cf".

$$Cf = \beta f^* - \beta f \qquad \text{Equation 6}$$

That is, in step S10, the front wheel control amount Cf is calculated on the basis of the difference between the target side slip angle βf* based on the target yaw rotation center position and the side slip angle βf. When the calculated "Cf" is a negative value, the yaw rotation center position R is located closer to the rear of the vehicle 1 than the target yaw rotation center position R*. On the other hand, when the calculated "Cf" is a positive value, the yaw rotation center position R is located closer to the front of the vehicle 1 than the target yaw rotation center position R*.

In step S11, a rear wheel control amount Cr is calculated on the basis of the target side slip angle βr* calculated in step S9 and the side slip angle βr calculated in step S6. Specifically, the rear wheel control amount Cr is calculated according to Equation 7 indicated below. In Equation 7, the rear wheel control amount Cr is "Cr".

$$Cr = \beta r^* - \beta r \qquad \text{Equation 7}$$

That is, in step S11, the rear wheel control amount Cr is calculated on the basis of the difference between the target side slip angle βr* based on the target yaw rotation center position and the side slip angle βr. When the calculated "Cr" is a negative value, the yaw rotation center position R is located closer to the rear of the vehicle 1 than the target yaw rotation center position R*. On the other hand, when the calculated "Cr" is a positive value, the yaw rotation center position R is located closer to the front of the vehicle 1 than the target yaw rotation center position R*.

In step S12, the front wheels 31, 32 are controlled on the basis of the front wheel control amount Cf calculated in step S10, and the rear wheels 33, 34 are controlled on the basis of the rear wheel control amount Cr calculated in step S11. In this way, the attitude of the vehicle 1 is controlled. Specifically, in step S12, the computation unit 49 outputs a control signal that indicates the front wheel control amount Cf calculated in step S10, to the front wheel control unit 6. In addition, the computation unit 49 outputs a control signal that indicates the rear wheel control amount Cr calculated in step S11, to the rear wheel control unit 7.

For example, when f*:Lr*=5:5, Equation 4 described above coincides with "βf*=βt/2", and a value obtained by multiplying the total slip angle βt by ½ is the magnitude of the target side slip angle βf*. In addition, Equation 5 described above coincides with "βr*=−βt/2", and a value obtained by multiplying the total slip angle βt by ½ is the magnitude of the target side slip angle βr*. When βf*=βt/2, "Cf=−0.5·βf−0.5·βr" holds according to Equations 3 and 6 described above and it is therefore possible to calculate the front wheel control amount Cf according to this equation. On the other hand, when βr*=−βt/2, "Cr=−0.5·βf−0.5·βr" holds according to Equations 3 and 7 described above and it is therefore possible to calculate the rear wheel control amount Cr according to this equation. In the present embodiment, it is possible to calculate the front wheel control amount Cf and the rear wheel control amount Cr according to the same equation.

For example, when Lf*:Lr*=3:7, Equation 4 described above coincides with "βf=3·βt/10", and a value obtained by multiplying the total slip angle βt by 3/10 is the magnitude of the target side slip angle βf*. In addition, Equation 5 described above coincides with "βr*=−7·βt/10", and a value obtained by multiplying the total slip angle βt by 7/10 is the magnitude of the target side slip angle βr*. When βf*=3·βt/10, "Cf=−0.7·βf−0.3·βr" holds according to Equations 3 and 6 described above and it is therefore possible to calculate the front wheel control amount Cf according to this equation. When βr*=−7·βt/10, "Cr=−0.7·⊖f−0.3·βr" holds according to Equations 3 and 7 described above and it is therefore possible to calculate the rear wheel control amount Cr according to this equation. In the present embodiment, it is possible to calculate the front wheel control amount Cf and the rear wheel control amount Cr according to the same equation.

In step S12, the front wheel control unit 6 that receives the control signal from the computation unit 49 controls the steered angle of the front wheels 31, 32 on the basis of the front wheel control amount Cf calculated in step S10 such that the yaw rotation center position R comes closer to the target yaw rotation center position R*. At this time, the larger the front wheel control amount Cf calculated in step S10 is, the larger the amount of change in the steered angle of the front wheels 31, 32 is. That is, the front wheel control amount Cf corresponds to the amount of change in the steered angle δ of the front wheels 31, 32.

In step S12, the rear wheel control unit 7 that receives the control signal from the computation unit 49 controls the driving force distribution ratio between the rear wheels 33, 34 on the basis of the rear wheel control amount Cr calculated in step S11 such that the yaw rotation center position R comes closer to the target yaw rotation center position R*. At this time, the larger the rear wheel control amount Cr calculated in step S11 is, the larger the difference between the driving force of the left rear wheel 33 and the driving force of the right rear wheel 34 is. That is, the rear wheel control amount Cr corresponds to a difference between the driving force of the left rear wheel 33 and the driving force of the right rear wheel 34.

In this way, the front wheel control unit 6 controls the attitude of the vehicle 1 on the basis of the front wheel control amount Cf calculated on the basis of the side slip angle βf and the side slip angle βr. Similarly, the rear wheel control unit 7 controls the attitude of the vehicle 1 on the basis of the rear wheel control amount Cr calculated on the basis of the side slip angle βf and the side slip angle βr.

Figure 4:
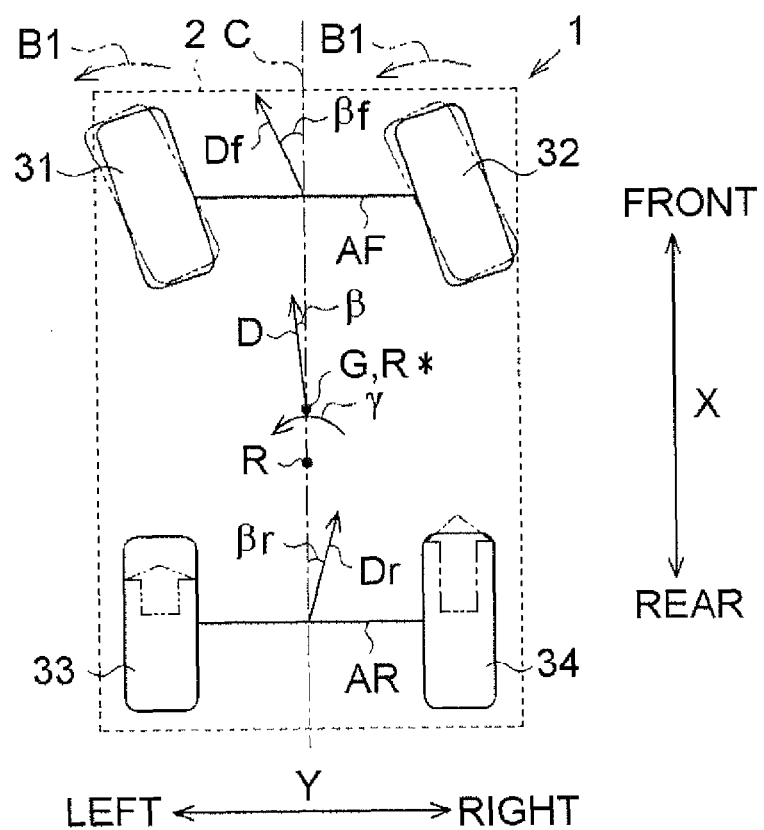
FIG. 4 is a diagram that shows vehicle attitude control executed by the vehicle attitude control system according to the embodiment.

Attitude control on the vehicle 1 in the case where the front wheel control amount Cf and the rear wheel control amount Cr are negative values will be described with reference to FIG. 4. At this time, the yaw rotation center position R is located closer to the rear of the vehicle 1 than the target yaw rotation center position R*. Description with reference to FIG. 4 will be provided on the assumption that the vehicle 1 is rotating in a direction indicated by the arrow γ. In FIG. 4, the target yaw rotation center position R* coincides with the position of the center of gravity G.

In the case where the yaw rotation center position R is located closer to the rear of the vehicle 1 than the target yaw rotation center position R*, the side slip angle βf is larger than the side slip angle βr, unlike in the case where the yaw rotation center position R is located closer to the front of the vehicle 1 than the target yaw rotation center position R*. At this time, by controlling the rear wheels 33, 34 provided on the rear axle AR at which the side slip angle βr, which is smaller than the side slip angle βf, is formed, it is possible to rotate the vehicle 1 more quickly than in the case where the front wheels 31, 32 provided on the front axle AF at which the side slip angle βf, which is larger than the side slip angle βr, is formed are controlled.

When the yaw rotation center position R is located closer to the rear of the vehicle 1 than the target yaw rotation center position R*, in order to bring the yaw rotation center position R closer to the target yaw rotation center position R*, the rear wheel control unit 7 makes the driving force of the right rear wheel 34, which is the outer wheel, larger than the driving force of the left rear wheel 33, which is the inner wheel, as indicated by long dashed double-short dashed line arrows in FIG. 4. In this way, the rear wheel control unit 7 further rotates the front portion of the vehicle 1 in the direction indicated by the arrow γ.

In addition, the front wheel control unit 6 rotates the rotation plane of each of the front wheels 31, 32 in the rotation direction of the vehicle 1. That is, as indicated by the long dashed double-short dashed line arrows B1 in FIG. 4, the front wheel control unit 6 increases the steered angle of the front wheels 31, 32. In this way, at the same time that the rear wheel control unit 7 controls the rear wheels 33, 34, the front wheel control unit 6 controls the front wheels 31, 32.

Attitude control on the vehicle 1 in the case where the front wheel control amount Cf and the rear wheel control amount Cr are positive values will be described with reference to FIG. 5. At this time, the yaw rotation center position R is located closer to the front of the vehicle 1 than the target yaw rotation center position R*. Description with reference to FIG. 5 will be provided on the assumption that the vehicle 1 is rotating in a direction indicated by the arrow γ. In addition, in FIG. 5, the target yaw rotation center position R* coincides with the position of the center of gravity G When the yaw rotation center position R is located closer to the front of the vehicle 1 than the target yaw rotation center position R*, the side slip angle βr is larger than the side slip angle βf, unlike in the case where the yaw rotation center position R is located closer to the rear of the vehicle 1 than the target yaw rotation center position R*. At this time, by controlling the front wheels 31, 32 provided on the front axle AF at which the side slip angle βf, which is smaller than the side slip angle βr, is formed, it is possible to rotate the vehicle 1 more quickly than in the case where the rear wheels 33, 34 provided on the rear axle AR at which the side slip angle βr, which is larger than the side slip angle βf, is formed are controlled.

Figure 5:
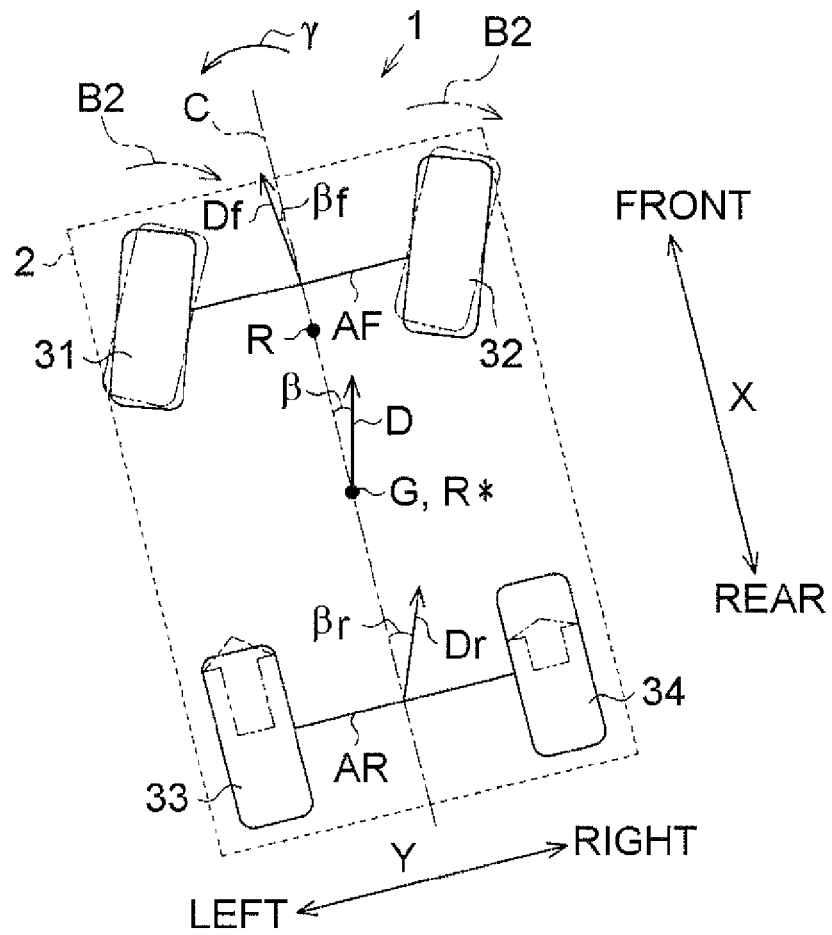
FIG. 5 is a diagram that shows vehicle attitude control executed by the vehicle attitude control system according to the embodiment.

When the yaw rotation center position R is located closer to the front of the vehicle 1 than the target yaw rotation center position R*, in order to bring the yaw rotation center position R closer to the target yaw rotation center position R*, the front wheel control unit 6 rotates the rotation plane of each of the front wheels 31, 32 in a direction opposite to the rotation direction of the vehicle 1 as indicated by long dashed double-short dashed line arrows B2 in FIG. 5, thereby rotating the front portion of the vehicle 1 in a direction opposite to the direction indicated by the arrow γ. That is, the front wheel control unit 6 decreases the steered angle of the front wheels 31, 32.

In addition, the rear wheel control unit 7 makes the driving force of the left rear wheel 3, which is the inner wheel, larger than the driving force of the right rear wheel 34, which is the outer wheel. In this way, at the same that the front wheel control unit 6 controls the front wheels 31, 32, the rear wheel control unit 7 controls the rear wheels 33, 34.

The operation of the control unit 10 will be described. The computation unit 49 calculates the front wheel control amount Cf and the rear wheel control amount Cr. The front wheel control unit 6 controls the front wheels 31, 32 on the basis of the front wheel control amount Cf. In addition, the rear wheel control unit 7 controls the rear wheels 33, 34 on the basis of the rear wheel control amount Cr. In this way, the control unit 10 controls the front wheels 31, 32 and the rear wheels 33, 34 by using the front wheel control unit 6 and the rear wheel control unit 7 in a coordinated manner.

The vehicle attitude control system 4 according to the present embodiment produces the following advantageous effects.

(1) The computation unit 49 that constitutes the control unit 10 calculates the front wheel control amount Cf and the rear wheel control amount Cr on the basis of the side slip angle βf at the front axle AF and the side slip angle βr at the rear axle AR. Then, the control unit 10 controls the front wheels 31, 32 on the basis of the front wheel control amount Cf with the use of the front wheel control unit 6 and controls the rear wheels 33, 34 on the basis of the rear wheel control amount Cr with the use of the rear wheel control unit 7 at the same time. Therefore, it is possible to calculate the front wheel control amount Cf or the rear wheel control amount Cr, which is used to control the attitude of the vehicle 1, on the basis of the side slip angle βf and the side slip angle βr, and it is possible to effectively execute control on the front wheels 31, 32 and control on the rear wheels 33, 34 in a coordinated manner. Therefore, it is possible to appropriately control the travel direction of the vehicle 1.

(2) The computation unit 49 that constitutes the control unit 10 calculates the front wheel control amount Cf and the rear wheel control amount Cr on the basis of the side slip angle βf, the side slip angle βr and the target yaw rotation center position R* of the vehicle 1. Therefore, even when the side slip angle βf and the side slip angle βr are constant, it is possible to change the front wheel control amount Cf and the rear wheel control amount Cr by changing the target yaw rotation center position R*.

(3) The computation unit 49 that constitutes the control unit 10 calculates the target side slip angle βf* on the basis of the target yaw rotation center position R* and the total slip angle βt that is the difference between the side slip angle βf and the side slip angle βr. Therefore, for example, even when the target yaw rotation center position R* is unchanged, it is possible to make the target side slip angle βf* small when the total slip angle βt is small, and it is possible to make the target side slip angle βf* large when the total slip angle βt is large. As a result, it is possible to change the front wheel control amount Cf on the basis of the difference between the side slip angle βf and the side slip angle βr.

(4) The computation unit 49 that constitutes the control unit 10 calculates the front-side target ratio (Lf*/L) that is the ratio of the distance Lf* from the front axle AF to the target yaw rotation center position R*, to the wheel base that is the distance from the front axle AF to the rear axle AR, and then calculates a value obtained by multiplying the total slip angle βt by the front-side target ratio, as the target side slip angle βf*. Therefore, when the total slip angle βt is small, it is possible to make the front wheel control amount Cf small. In addition, when the front-side target ratio is small, it is possible to make the front wheel control amount Cf small.

(5) The computation unit 49 that constitutes the control unit 10 calculates the target side slip angle βr* on the basis of the target yaw rotation center position R* and the total slip angle βt that is the difference between the side slip angle βf and the side slip angle βr. Therefore, for example, even when the target yaw rotation center position R* is unchanged, it is possible to make the target side slip angle βr* small when the total slip angle βt is small, and it is possible to make the target side slip angle βr* large when the total slip angle βt is large. As a result, it is possible to change the rear wheel control amount Cr on the basis of the difference between the side slip angle βf and the side slip angle βr.

(6) The computation unit 49 that constitutes the control unit 10 calculates the rear-side target ratio (Lr*/L) that is the ratio of the distance Lr* from the rear axle AR to the target yaw rotation center position R*, to the wheel base that is the distance from the front axle AF to the rear axle AR, and then calculates a value obtained by multiplying the total slip angle βt by the rear-side target ratio, as the target side slip angle βr*. Therefore, when the total slip angle βt is small, it is possible to make the rear wheel control amount Cr small. In addition, when the rear-side target ratio is small, it is possible to make the rear wheel control amount Cr small.

(7) The vehicle attitude control system 4 includes the slip angle estimation unit 5, and the computation unit 49 that constitutes the control unit 10 calculates the side slip angle βf and the side slip angle βr on the basis of the side slip angle β estimated by the slip angle estimation unit 5. Therefore, it is possible to estimate the side slip angle βf and the side slip angle βr without using a plurality of slip angle estimation units.

(8) The computation unit 49 of the control unit 10 decreases the front wheel control amount Cf and the rear wheel control amount Cr as the total slip angle βt that is the difference between the side slip angle βf and the side slip angle βr decreases. When the speed of yaw rotation of the vehicle 1 is low, the side slip angle βf and the side slip angle βr are small. Therefore, when the speed of yaw rotation of the vehicle 1 is low, the total slip angle βt that is the difference between the side slip angle βf and the side slip angle βr is also small. Therefore, when the speed of yaw rotation of the vehicle 1 is low, it is possible to suppress control on the front wheels 31, 32 and control on the rear wheels 33, 34, which exert influence on the attitude of the vehicle 1.

The invention includes embodiments other than the above-described embodiment. Hereinafter, modified examples of the above-described embodiment, which are other embodiments of the invention, will be described. The following modified examples may be combined with each other.

In the vehicle attitude control system 4 according to the embodiment, the rear wheel control unit 7 is formed of a right and left driving force distribution control unit. On the other hand, in the vehicle attitude control system 4 according to a modified example, the rear wheel control unit 7 is formed of an independent driving control unit. In addition, in the vehicle attitude control system 4 according to a modified example, the rear wheel control unit 7 is formed of a rear wheel steering control unit that is able to control the steered angle of the rear wheels 33, 34. In this case, the larger the rear wheel control amount Cr calculated in step S11 is, the larger the amount of change, in step S12, in the steered angle of the rear wheels 33, 34 is. That is, the rear wheel control amount Cr in the modified example corresponds to the amount of change in the steered angle of the rear wheels 33, 34. Even when the rear wheel control unit 7 is formed of the independent driving control unit or the rear wheel steering control unit, advantageous effects similar to those of the above-described embodiment are obtained. That is, the rear wheel control unit 7 is not limited to the driving force distribution control unit that controls the ratio in the driving force between the rear wheels 33, 34.

Figure 6:
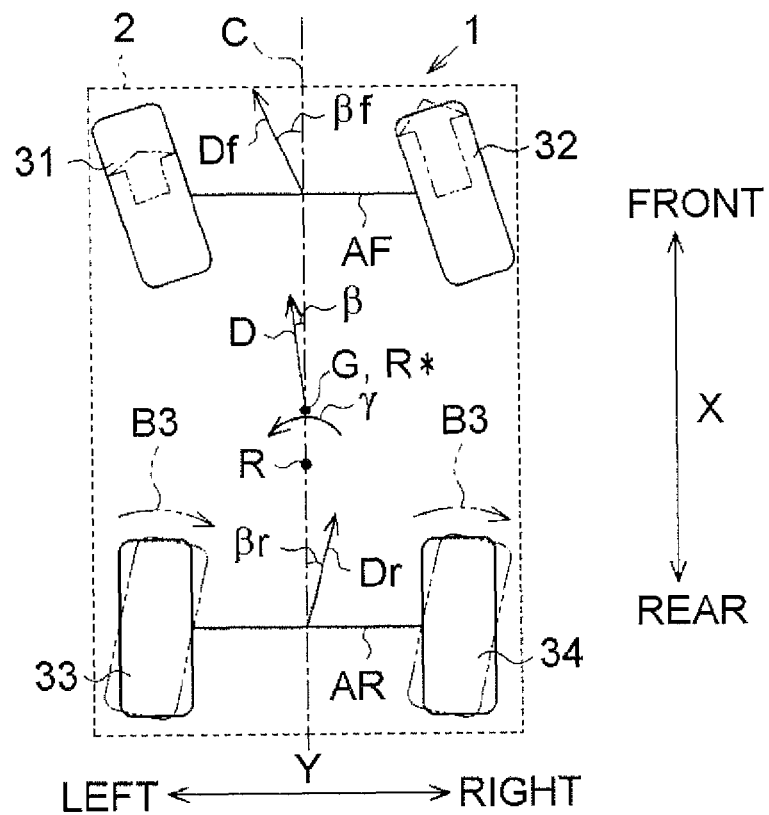
FIG. 6 is a diagram that shows vehicle attitude control executed by a vehicle attitude control system according to another embodiment of the invention.

In the vehicle attitude control system 4 according to the embodiment, the front wheel control unit 6 is formed of an active steering control unit. On the other hand, in the vehicle attitude control system 4 according to a modified example, the front wheel control unit 6 is formed of an independent driving control unit or a right and left driving force distribution control unit. The front wheel control unit 6 needs to be configured to be able to change the steered angle of the front wheels 31, 32. When the front wheel control unit 6 is formed of a right and left driving force distribution control unit, the larger the front wheel control amount Cf calculated in step S10 is, the larger the difference between the driving force of the left front wheel 31 and the driving force of the right front wheel 32 is set in step S12. That is, the front wheel control amount Cf corresponds to the difference between the driving force of the left front wheel 31 and the driving force of the right front wheel 32, the front wheels 31, 32 being drive wheels. Even when the front wheel control unit 6 is formed of the right and left driving force distribution control unit, advantageous effects similar to those of the above-described embodiment are obtained. That is, the front wheel control unit 6 is not limited to the active steering control unit, such as a differential mechanism control unit or a steer-by-wire control unit, which controls the steered angle of the front wheels 31, 32, With reference to FIG. 6, there will be provided description concerning attitude control on the vehicle 1 in the case where the rear wheel control unit 7 is formed of a rear wheel steering control unit, the front wheel control unit 6 is formed of a right and left driving force distribution control unit and the front wheel control amount Cf and the rear wheel control amount Cr are negative values. At this time, the yaw rotation center position R is located closer to the rear of the vehicle 1 than the target yaw rotation center position R*. Description with reference to FIG. 6 will be provided on the assumption that the vehicle 1 is rotating in a direction indicated by the arrow γ. In addition, in FIG. 6, the target yaw rotation center position R* coincides with the position of the center of gravity G When the yaw rotation center position R is located closer to the rear of the vehicle 1 than the target yaw rotation center position R*, in order to bring the yaw rotation center position R closer to the target yaw rotation center position R*, the rear wheel control unit 7 rotates the rotation plane of each of the rear wheels 33, 34 in a direction opposite to the rotation direction of the vehicle 1 as indicated by long dashed double-short dashed line arrows B3 in FIG. 6, thereby further rotating the front portion of the vehicle 1 in the direction indicated by the arrow γ.

In addition, the front wheel control unit 6 makes the driving force of the right front wheel 32, which is the outer wheel, larger than the driving force of the left front wheel 31, which is the inner wheel. In this way, at the same time that the rear wheel control unit 7 controls the rear wheels 33, 34, the front wheel control unit 6 controls the front wheels 31, 32.

Figure 7:
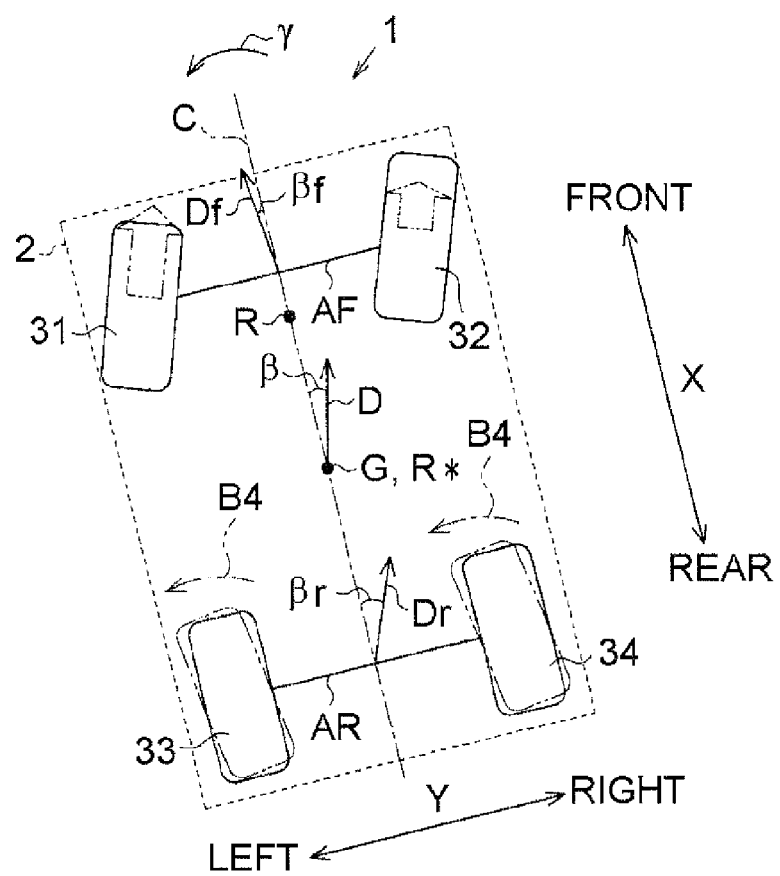
FIG. 7 is a diagram that shows vehicle attitude control executed by a vehicle attitude control system according to another embodiment of the invention.

With reference to FIG. 7, there will be provided description concerning attitude control on the vehicle 1 in the case where the rear wheel control unit 7 is formed of a rear wheel steering control unit, the front wheel control unit 6 is formed of a right and left driving force distribution control unit and the front wheel control amount Cf and the rear wheel control amount Cr are positive values. At this time, the yaw rotation center position R is located closer to the front of the vehicle 1 than the target yaw rotation center position R*. Description with reference to FIG. 7 will be provided on the assumption that the vehicle 1 is rotating in a direction indicated by the arrow γ. In addition, in FIG. 7, the target yaw rotation center position R* coincides with the position of the center of gravity G.

When the yaw rotation center position R is located closer to the front of the vehicle 1 than the target yaw rotation center position R*, in order to bring the yaw rotation center position R closer to the target yaw rotation center position R*, the front wheel control unit 6 makes the driving force of the left front wheel 31 larger than the driving force of the right front wheel 32 as indicated by long dashed double-short dashed line arrows in FIG. 7, thereby rotating the front portion of the vehicle 1 in a direction opposite to the direction indicated by the arrow γ.

In addition, as indicated by the long dashed double-short dashed line arrows B4 in FIG. 7, the rear wheel control unit 7 rotates the rotation plane of each of the rear wheels 33, 34 in the rotation direction of the vehicle 1. In this way, at the same time that the front wheel control unit 6 controls the front wheels 31, 32, the rear wheel control unit 7 controls the rear wheels 33, 34.

In the vehicle attitude control system 4 according to the embodiment, the target yaw rotation center position R* coincides with the position of the center of gravity G. On the other hand, in the vehicle attitude control system 4 according to a modified example, the target yaw rotation center position R* does not coincide with the center of gravity G. That is, the target yaw rotation center position R* is not limited to the position of the center of gravity G.

The vehicle body slip angle estimation unit 5 according to the embodiment calculates the side slip angle of the vehicle body 2 on the basis of the yaw rate and acceleration of the vehicle 1 and the coefficient of friction of a road surface. On the other hand, the vehicle body slip angle estimation unit 5 according to a modified example includes a tire lateral force sensor that detects a lateral force that acts on each wheel 3, and calculates the side slip angle on the basis of the lateral force that acts on each wheel 3 instead of the coefficient of friction of a road surface. With the above configuration, it is possible to estimate the side slip angle without estimating the coefficient of friction of a road surface. Therefore, even when the coefficient of friction of a road surface is not accurately estimated, it is possible to suppress a decrease in the accuracy of estimation of the side slip angle.

In the vehicle attitude control system 4 according to the embodiment, the computation unit 49 calculates the side slip angle βf and the side slip angle βr on the basis of the side slip angle β at a predetermined location of the vehicle 1, which is estimated by the vehicle body slip angle estimation unit 5. On the other hand, the vehicle attitude control system 4 according to a modified example includes a unit that detects the side slip angle βf and a unit that detects the side slip angle βr. That is, it is not necessary to calculate the side slip angle βf and the side slip angle βr on the basis of the side slip angle β at a predetermined location of the vehicle 1.

What is claimed is:

1. A vehicle attitude control system, comprising:
a control unit (i) that calculates a front wheel control amount and a rear wheel control amount on the basis of a front-side slip angle that is a side slip angle at an axle of front wheels, a rear-side slip angle that is a side slip angle at an axle of rear wheels, and a target position of the vehicle that is different than a position of the center of gravity of the vehicle and that serves as a rotation center point to achieve a target yaw rate; and (ii) that controls the front wheels on the basis of the front wheel control amount and controls the rear wheels on the basis of the rear wheel control amount at the same time,
wherein the control unit calculates the front wheel control amount on the basis of a difference between a target front-side slip angle based on the target position and the front-side slip angle.

2. The vehicle attitude control system according to claim 1, wherein the control unit calculates the target front-side slip angle on the basis of the target position and a total slip angle that is a difference between the front-side slip angle and the rear-side slip angle.

3. The vehicle attitude control system according to claim 2, wherein the control unit calculates a front-side target ratio that is a ratio of (i) a distance from the axle of the front wheels to the target position to (ii) a distance from the axle of the front wheels to the axle of the rear wheels, and calculates, as the target front-side slip angle, a value obtained by multiplying the total slip angle by the front-side target ratio.

4. The vehicle attitude control system according to claim 1, further comprising:
a slip angle estimation unit that estimates a side slip angle at a predetermined location of the vehicle, wherein
the control unit calculates the front-side slip angle and the rear-side slip angle on the basis of the side slip angle estimated by the slip angle estimation unit.

5. The vehicle attitude control system according to claim 1, wherein the control unit makes the front wheel control amount and the rear wheel control amount smaller as a total slip angle that is a difference between the front-side slip angle and the rear-side slip angle becomes smaller.

6. A vehicle attitude control system, comprising:
a control unit (i) that calculates a front wheel control amount and a rear wheel control amount on the basis of a front-side slip angle that is a side slip angle at an axle of front wheels, a rear-side slip angle that is a side slip angle at an axle of rear wheels, and a target position of the vehicle that is different than a position of the center of gravity of the vehicle and that serves as a rotation center point to achieve a target yaw rate; and (ii) that controls the front wheels on the basis of the front wheel control amount and controls the rear wheels on the basis of the rear wheel control amount at the same time,
wherein the control unit calculates the rear wheel control amount on the basis of a difference between a target rear-side slip angle based on the target position and the rear-side slip angle.

7. The vehicle attitude control system according to claim 6, wherein the control unit calculates the target rear-side slip angle on the basis of the target position and a total slip angle that is a difference between the front-side slip angle and the rear-side slip angle.

8. The vehicle attitude control system according to claim 7, wherein the control unit calculates a rear-side target ratio that is a ratio of (i) a distance from the axle of the rear wheels to the target position to (ii) a distance from the axle of the front wheels to the axle of the rear wheels, and calculates, as the target rear-side slip angle, a value obtained by multiplying the total slip angle by the rear-side target ratio.

* * * * *